Figure 1:
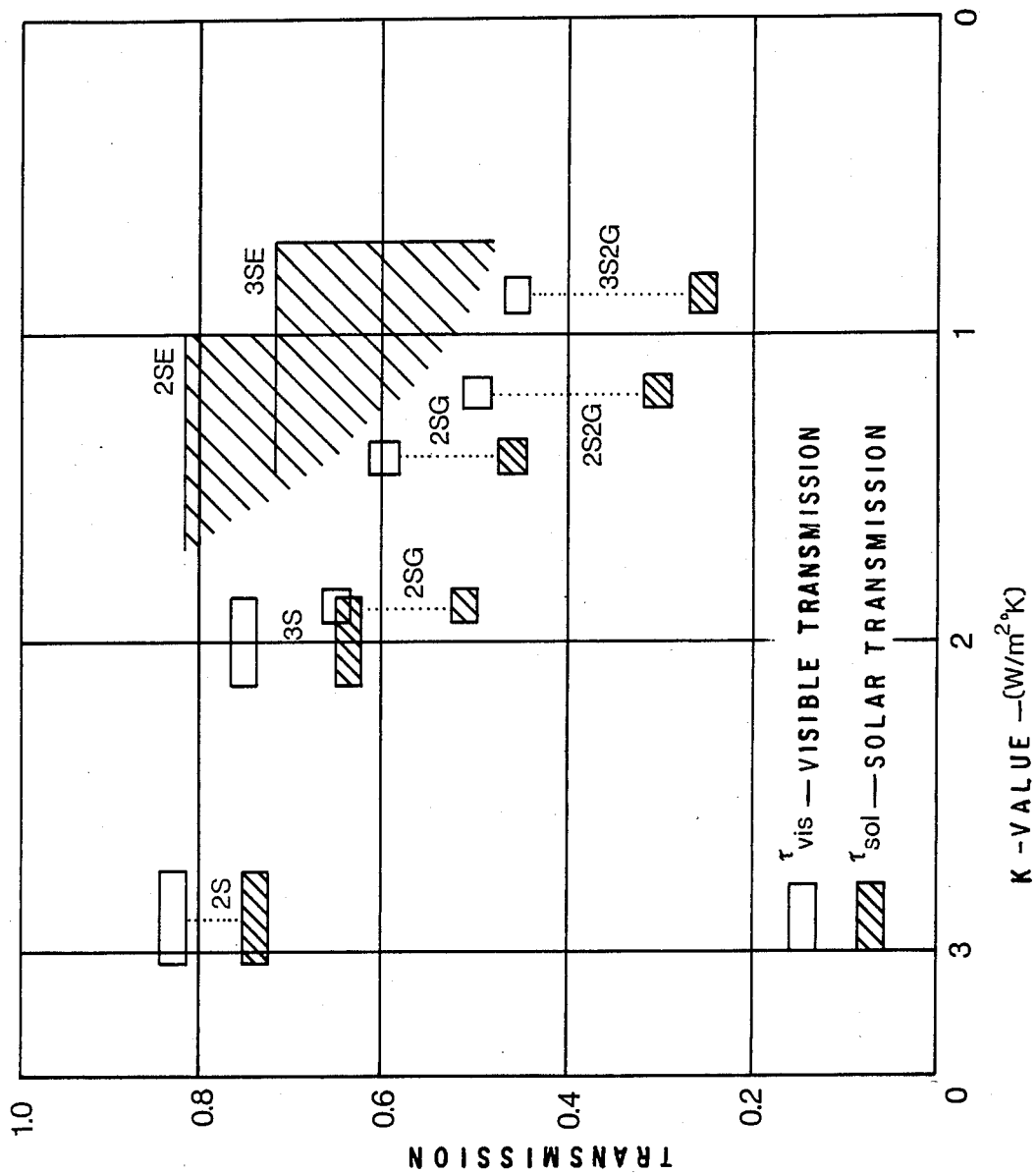

United States Patent [19]

Scherber

[11] Patent Number: 4,579,638

[45] Date of Patent: Apr. 1, 1986

[54] COLOR-NEUTRAL, SOLAR-SELECTIVE, HEAT-REFLECTING COATING FOR GLASS PANES

[75] Inventor: Werner Scherber, Bermatingen, Fed. Rep. of Germany

[73] Assignee: Dornier System Gesellshaft mit beschreänkter Haftung, Friedrichshafen, Fed. Rep. of Germany

[21] Appl. No.: 545,091

[22] Filed: Oct. 25, 1983

[30] Foreign Application Priority Data

Oct. 27, 1982 [DE] Fed. Rep. of Germany ....... 3239753

[51] Int. Cl.$^4$ .............................................. C23C 15/00
[52] U.S. Cl. ............................ 204/192 P; 204/192 R; 427/38; 427/39; 428/432
[58] Field of Search ................... 428/432; 204/192 P; 427/38, 39

[56] References Cited

U.S. PATENT DOCUMENTS

| | | | |
|---|---|---|---|
| 3,990,784 | 11/1976 | Gelber | 428/432 |
| 4,041,436 | 8/1977 | Kouchich et al. | 428/432 |
| 4,069,630 | 1/1978 | Chess et al. | 428/432 |
| 4,076,542 | 2/1978 | Deeg et al. | 428/432 |
| 4,146,677 | 3/1979 | Merz et al. | 428/432 |
| 4,235,951 | 11/1980 | Swarovski | 428/432 |
| 4,322,276 | 3/1982 | Meckel et al. | 204/192 P |
| 4,336,119 | 6/1982 | Gillery | 204/192 P |
| 4,340,508 | 7/1982 | Wahlers et al. | 428/432 |
| 4,340,645 | 7/1982 | O'Conor | 428/432 |
| 4,377,613 | 3/1983 | Gordon | 428/432 |

Primary Examiner—Arthur P. Demers
Attorney, Agent, or Firm—Hammond & Littell, Weissenberger & Dippert

[57] ABSTRACT

A selective coating for insulating glass, having high color neutrality, high solar transmissivity, a low K-value and great stability, consists of an electrically conductive layer in which very small, transparent, non-conductive particles are embedded.

21 Claims, 3 Drawing Figures

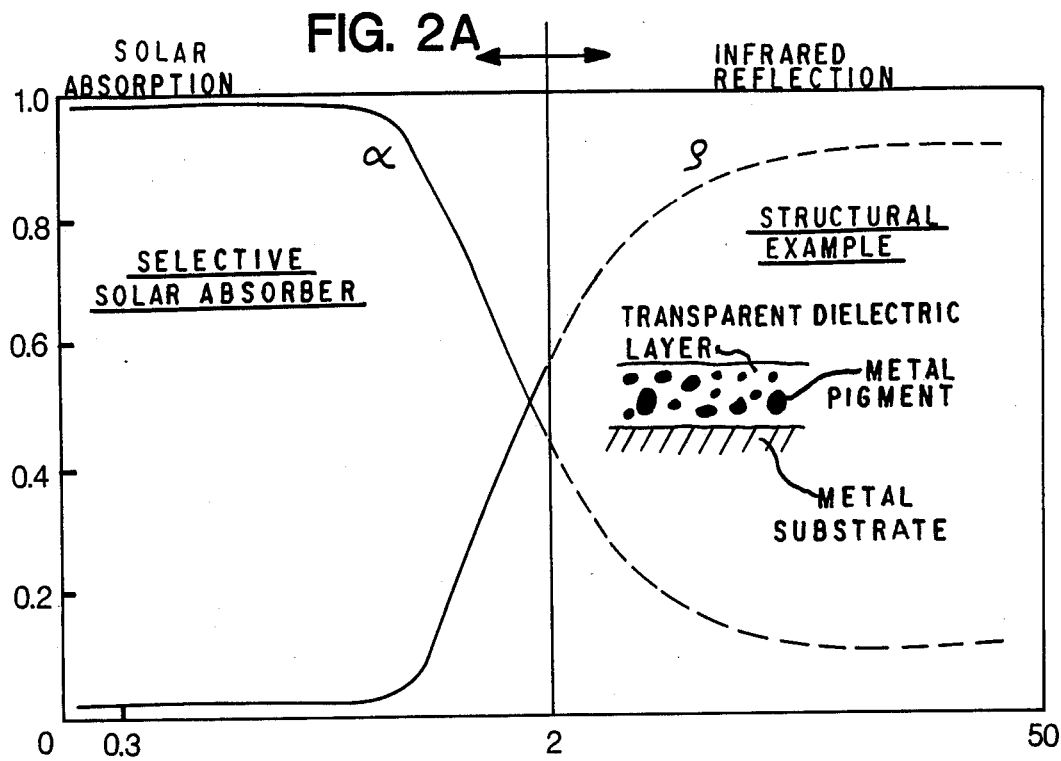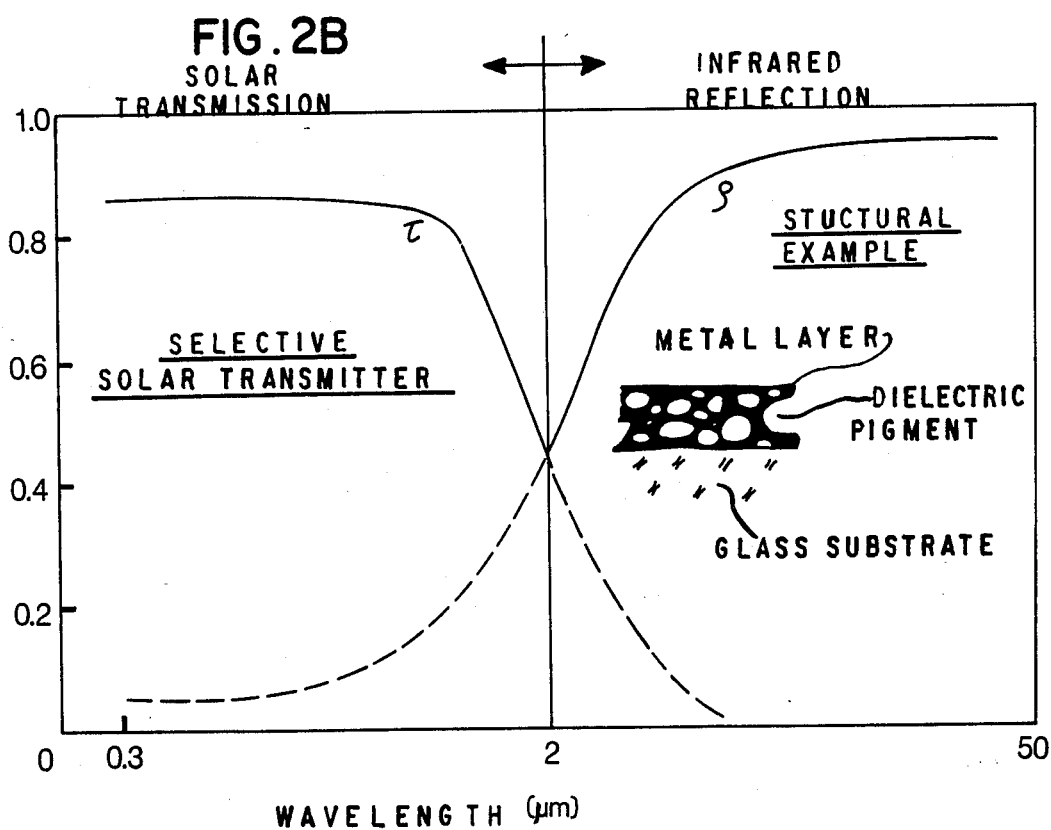

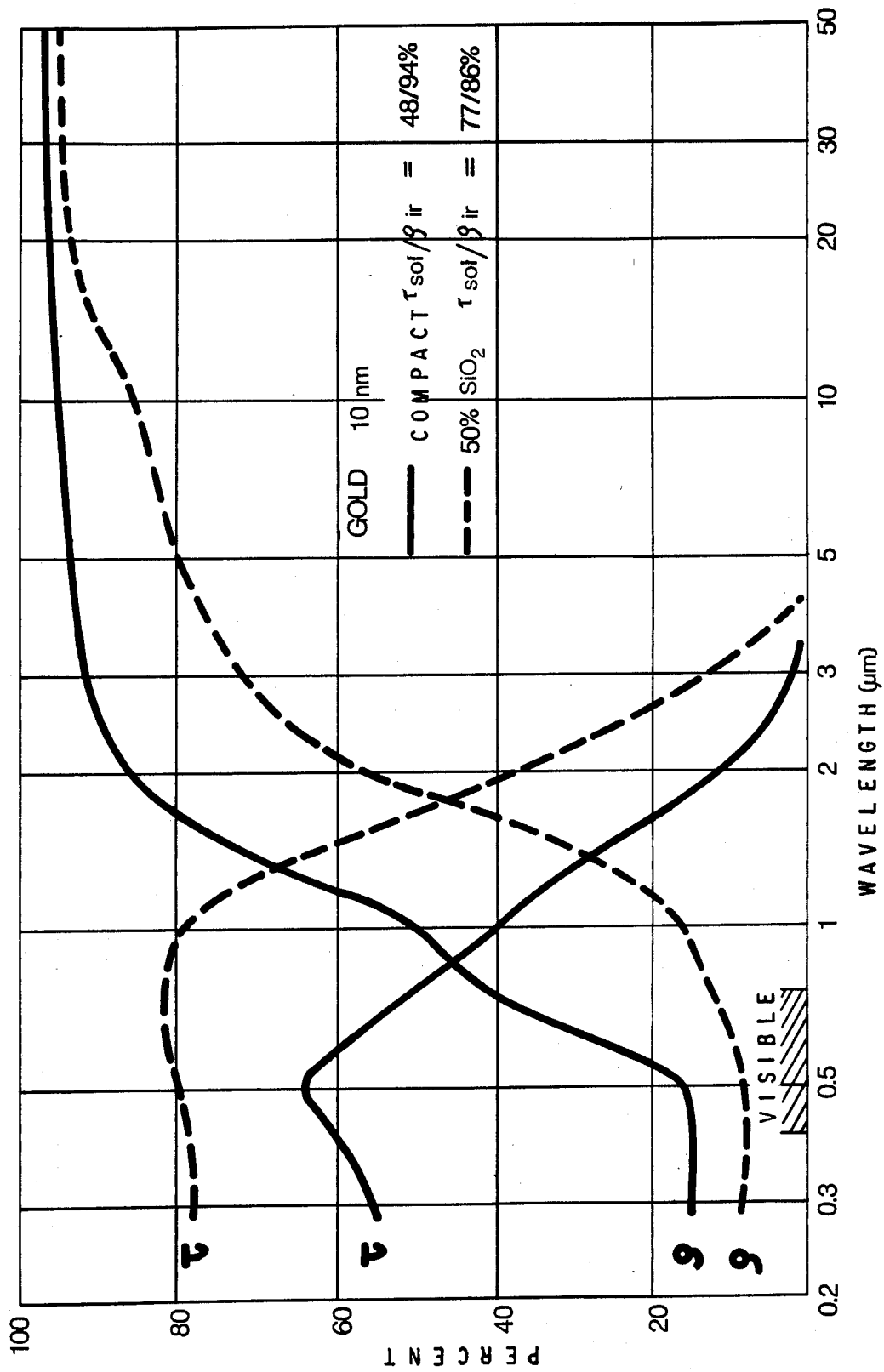

COLOR-NEUTRAL, SOLAR-SELECTIVE, HEAT-REFLECTING COATING FOR GLASS PANES

This invention relates to a spectral-selective coating for insulating glass, which is characterized particularly by high solar transmission (energy gain), a low K-value (heat transition identical with U-value), and high color neutrality. In addition to the use for energy-saving windows, the invention is also suitable for use in solar collectors, sun facades and the like.

BACKGROUND OF THE INVENTION

In the heat insulation of buildings, by far the weakest points are the windows. Simple double glazings of windows allow more than 3 watts per square meter and degree temperature difference to get lost, while the heat transition coefficient (K-value) of well-insulating walls is under 0.6.

Windows, however, cause not only heat losses; with proper arrangement they also bring an energy gain by the daily irradiation, even in winter and under a cloudy sky. It is generally recognized today that window elements are one of the most important components for passive solar utilization, and it can be foreseen that this finding will find its expression in the future even more in corresponding architectural and structural engineering solutions.

Large-surfaced glazing of residential rooms, however, requires a particularly low K-value, possibly comparable with that of the brickwork; otherwise there is no comfort due to physiological radiation and the increased air circulation in front of the cold glass wall, and the efficiency is offset again by the higher room temperature level.

The insulating glass available today does not nearly exhaust the physical possibilities. While in the last years intensive work has been done to improve the heat insulation of window elements and certain progress has been made, an increase in the solar transmission has not been achieved. On the contrary: the unilateral emphasis on the K-value has led to the development of heat reflecting layers which reduce the total transmission. The data of the manufacturers in this respect are therefore mostly confined to the maximum transmission at a certain wavelength in the visible range. The presently available gold-coated glasses with two panes have a solar transmission of almost 50%. Besides, thin gold coatings produce conspicuous color effects which prevent their wide use in residential buildings for esthetic reasons.

Known three-pane insulating glasses offer in this respect no convincing solution either, since only K-values of about 1.9 W/m²K are attained, and the third pane results likewise in marked reduction of the transmission, as well as increased material costs and weight.

The known technique of filling the space between glass panes with a suitable heavy gas, like freon or sulfur hexafluoride, to reduce the thermal conductivity of the unit, can be considered as perfected. Alternate gases which meet all physical and chemical requirements and are also non-toxic, non-flammable, safe and inexpensive are not available.

The situation is similar in selective coating, which is used to reduce the heat radiation of the glass pane and thus to bring about a clear improvement of the K-value. A reduction of the K-value below 1.4 W/m²K requires according to today's knowledge the selective coating of at least two glass surfaces of the insulating glass unit, which is not possible on the basis of the known layers for the above-mentioned reasons: Lack of transmission and color neutrality.

Two basic types of selectively transmissive layers are known at present: Transparent semiconductor layers, like doped tin oxide or indium oxide and very thin noble metal films of gold, silver, copper and the like. Despite many production suggestions described in the literature, only gold coating by cathode sputtering could assert itself commercially. Tin oxide layers, as they are produced, for example, by dipping, are not transmissive enough for insulating glass. The use of indium oxide was thoroughly investigated, but had to be given up because of the high processing costs. Other presently known semiconductor materials with usable optical properties are not available.

For the gold coat there is no true alternative either, despite its weaknesses, because this noble metal combines two necessary properties, namely high chemical stability and good electrical conductivity. Other good electron conductors are not so stable (for example copper or silver), likewise not color neutral, or prohibitive in their material costs (for example platinum or rhodium).

It is now being tried to overcome these difficulties by building multi-layer systems of three or more semiconductor and metal films, but it can be foreseen that the possible minor improvements of the optical characteristics will be offset by increasing coating costs, so that no technical progress can be achieved.

It is known that the optical constants of metals or composite materials are influenced by geometric structuring. For example: a reliable and binding measurement of optical constants is so difficult, because the results depend greatly on micro-structural parameters such as particle size, orientation, contamination, surface roughness, oxide film and the like. Despite these generally known relations, no concrete data for the production of selectively transmissive structural filters can be found in the literature.

The following is known from the state of the art:

SURFACE ROUGHNESS

As numerous studies (for instance R. E. Rolling, A. T. Tunai, J. R. Grammer: Investigation of the effect of surface conditions on the radiant properties of metals; Lockheed Missiles and Space Company, Techn. Report No. AFML TR 64-363, November 1964) verify, the absorptivity and emissivity increase with increasing surface roughness of opaque substances, while the reflectivity decreases. Another group of studies (for instance M. J. Minot: Single layer gradient reflective index of antireflection films effective from 0.35 to 2.5 μm, J. Opt. Soc. Amer. 66, 515 [1976]), is directed to the transmission and reflection behavior of transparent materials with surfaces of different roughness. The total transmittance generally increases in the transition from smooth to rough surfaces, because a "soft" transition of the refractive index is produced, so that Fresnel reflection is to a great extent avoided. Apart from these surface modifications, the known studies refer to homogeneous materials whose "internal transmissivity" remains constant. But the instant invention concerns the variation of the optical constants of the total layer, so that internal and external transmissivity are reduced without an antireflection layer or antireflection zone on the surface being introduced.

COMPOSITE STRUCTURES

An example for the influence of structuring on the internal or specific material properties is the development of the selective solar absorbers. It has been known for a long time that metals undergo a resonance-like increase of the absorptivity in dispersion [R. H. Doremus: Optical properties of Small Gold Particles; J. Chemical Physics, 40, 2389 (1964)]. This can be seen in metallic aerosols or hydrosols, or in the incorporation of minute metal particles in glass. If the pigmented glass layer is very thin and applied on a metallic base, an effective selective solar absorber can be formed, since the short-wave sunlight is absorbed, while the long-wave IR-radiation is transmitted by the pigment structure so that the high reflectivity of the base comes into play.

GRID STRUCTURES

Known is the suggestion of making thin metal or semiconductor films transmissive in the solar range by the use of grid or mesh structures, while still maintaining the great infrared reflection effect [J.C.C. Fan, F. J. Bachner, T. A. Murphy: Thin film conducting microgrids as transparent heat mirror; Appl. Phys. Letters, 28, 440, (1976)]. The basic idea is to dimension the mesh aperture a so that it is greater than the wavelength of the solar radiation $\lambda_{sol}$ ($a > \lambda_{sol}$), but less than the wavelength of the heat radiation ($a < \lambda_{IR}$). With an optimum mesh aperture of $a = 2.5$ μm, the transmission of the solar radiation is determined substantially by the rules of geometric optics (aperture surface to web surface), while the IR-radiation is reflected like on an umbrella-type antenna. Despite this plausible representation, the grid structure could not assert itself.

Fan et al. (supra) report that a transmission increase from 0.8 to 0.9 is offset by a reflection reduction from 0.91 to 0.83. A similar displacement could already be obtained by a reduction of the layer thickness. A general treatment of the problem is known (D. Pramanik, A. J. Sievers, R. H. Silsbee: The spectral selectivity of conducting micromeshes. Solar Energy Mat. 2, 81, 1979). On the basis of principal considerations it was found that grid structures of semiconductors and of most metals always show a less favorable behavior than homogeneous films. Grids of aluminum or magnesium were said to have a limited application, but the additional conditions necessary (web height >> web width; vertical angle of incidence) are so severe, that application for window panes is out of the question.

OBJECTS OF THE INVENTION

It is an object of the present invention to provide a coating for an insulating glass unit, consisting preferably of two glass panes with a gas-filled space between them, which has a high transmission of solar radiation in conjunction with a low K-value and adequate color neutrality.

Other objects and advantages of the invention will become apparent as the description thereof proceeds.

DESCRIPTION OF THE INVENTION

The above object is achieved in accordance with the present invention by a coating which consists of an electrically conductive layer having very small, transparent, non-conductive particles embedded therein. Unlike the known systems composed of homogeneous metallic or semi-conductive layers, the coating of the instant invention consists of a composite material where spatially distributed small dielectric zones or particles are embedded in a continuous conductive layer.

According to the invention, on the one hand a high electronic conductivity of the layer is achieved, at least in local partial zones, and on the other hand a disproportionally high wide-band transmission for solar radiation is achieved. The increase in solar transparency is achieved by the interaction of two mechanisms: On the one hand, the absorption coefficient of the layer is greatly reduced, that is, by a factor of 3 to 10, so that the penetration depth or the "internal transmissivity" increases correspondingly, and on the other hand, the refractive index n of the layer is set to a value between 1 and 1.5, that is, between the value of air and glass substrate, so that a marked antireflection effect is achieved and the "external transmission" also increases.

The increased transmission can be utilized in two respects. In glazings with direct solar irradiation in winter and shading possibility in summer, the transmission increase alone results in a great reduction of the equivalent K-value, $K_{eq}$ ($K_{eq}$ is defined, for example, in G. Ortmanns: Bauelemente mit Flachglas, ihre Bedeutung im Hinblick auf Energieeinsparung im Bauwesen (Structural elements with plate glass, their significance in view of energy savings in construction), Glastechnische Berichte 53, 237 (1980), that is, the heat balance of such a unit yields high positive values.

With less irradiated surfaces, that is, windows and facades pointing to the North, it is of greater advantage to apply the layer on both inner surfaces of the insulating glass unit and thus to reduce the K-value directly. For these double-coated panes heat transition coefficients of under 1 W/m²K were predicted. Today's available selective layers would not be suitable for this purpose because of the great darkening effect alone.

In order to facilitate the understanding of the present invention, we will briefly discuss the optics of thin conductive layers.

An inherent characteristic of a heat-reflecting glass coating is the different depth of penetration for visible light and for infrared radiation. Generally, the thickness of a layer must be chosen to be at least as great as that which corresponds to the depth of penetration for infrared radiation in the respective layer material. In order to achieve high degrees of heat reflection, other requirements must naturally be met, apart from the layer thickness, particularly metallic conductivity. If this minimum layer thickness is clearly less than the depth of penetration for visible light, then the necessary prerequisite for selective transmission is provided.

Quantitatively, the penetration is related in a simple manner to the absorption coefficient k and the wavelength: $W = \lambda/4\pi k$.

After penetrating the boundary surface, W is independent of the refractive index n.

The following are the corresponding values for some metals:

| Metal | Visible ($\lambda = 0.5$ μm) | | | Infrared ($\lambda = 10$ μm) | | | $\dfrac{W_{vis}}{W_{IR}}$ |
|---|---|---|---|---|---|---|---|
| | n | k | $W_{vis}$ | n | k | $W_{IR}$ | |
| Au | 0.7 | 1.64 | 24.3 nm | 6 | 70 | 11.4 nm | 2.13 |
| Ag | 0.24 | 3.0 | 13.2 nm | 10 | 90 | 8.8 nm | 1.5 |
| Ti | 1.8 | 2.4 | 16.6 nm | 9 | 36 | 22.1 nm | 0.75 |

| Metal | Visible (λ = 0.5 μm) | | | Infrared (λ = 10 μm) | | | $\frac{W_{vis}}{W_{IR}}$ |
|---|---|---|---|---|---|---|---|
| | n | k | $W_{vis}$ | n | k | $W_{IR}$ | |
| Gd | 1.35 | 0.8 | 39.8 nm | 3 | 1.22 | 653 nm | 0.08 |

This table readily explains the relatively good suitability of gold as a selective layer for windows, since the depth of penetration for visible light is more than twice that for infrared radiation. Whereas good electron conductors like gold, copper and silver have $W_{vis}/W_{IR}$ factors of about 1 or more, those of other metals are mostly much lower.

These relations make it clear in a simple manner that it is not possible, based on laws of nature, to produce good solar-selective transmitters with homogeneous metallic layers—with the exception of the known examples.

Low absorption coefficients k in the visible light range generally also cause a low k in the infrared light range, and vice versa.

Thus, the essential feature of the invention resides in that it shows a way of how to resolve this unfavorable internal relation of metallic materials, that is, how to achieve a great reduction of the absorption co-efficient in the visible or solar spectral range without substantially varying the electronic conductivity and the infrared reflectivity.

The components of the composite layer must meet certain requirements to have a favorable influence on the ratio solar transmission to heat reflection, $\lambda_{sol}/\rho_{IR}$. The following rules can be derived from the foregoing considerations: The diameters of the particles or pores embedded in the metal layer should be smaller than the layer thickness and smaller than the shortest transmitted light wavelength. The volume fraction of the dielectric zones should be at least 50%. The dielectric zones can be spherical or needle-shaped, with the longitudinal axis perpendicular to the layer surface. In the solar spectral range, particularly at λ=0.5 μm, the following relations should apply to the optical constants of the carrier (matrix) T and of the particles P:

$$1 < k_T < 2.5 : n_T < 1$$
$$n_P \approx k_T \quad : k_P = 0$$

Expressed in words: The carrier material (metal or semiconductor) should have an absorption coefficient between 1 and 2.5, which comes as close as possible to the value of the refractive index of the dielectric pigment. In addition, the refractive index of the carrier should be very small, and favorably not greater than 1.

An additional advantage, though not necessary condition is that the pigment should also be transmissive in the infrared, at about λ=10 μm: $k_P=0$ (infrared).

A look at the optical constants of available materials shows that these conditions greatly limit the selection of suitable pairs of materials. Particularly restrictive is the condition $n_T<1$, which can be satisfied or at least substantially satisfied by only a few pure metals, such as Au, Ag, Cu, Al, Mg, Y, Zr and some lanthanides. When observing the rule $k_T<2.5$, gold is of particular importance. The selection of suitable dielectric pigments, however, is less problematic. In addition to air with $n_P=1$, there are a number of transparent compounds with suitable refractive indices available, particularly oxides and fluorides, like $SiO_2$, $Al_2O_3$ or $MgF_2$. The additional requirement of infrared transparency can also be met, for example, by many plastics such as polyester, polyethylene or polypropylene, by transparent semiconductors such as indium oxide, tin oxide, as well as by some alkali metal and alkaline earth metal halides.

The mention of particularly suitable substrate materials, such as gold, does not mean that the invention is limited to these elements. It is only a selection of materials with presently known optical constants. Basically, many other conductive materials are conceivable, the optical characteristics of which have not yet been determined because of lack of technical importance, such as intermetallic compounds of the alkali metal and alkaline earth metal elements.

Other advantages, features and applications of the invention will become apparent from the description of the attached drawings in which FIG. 1 shows a comparison of the transmission- and K-values between the state of the art and the invention, and FIGS. 2 and 3 show spectral curves of the state of the art and of the invention.

FIG. 1 shows graphically transmission- and K-values of different insulating glass types according to the state of the art and the field attainable by the invention.

The abbreviations have the following meaning:

| 2 S and 3 S | two- and three-pane insulating glass without coating. |
|---|---|
| 2 S G | two-pane insulating glass with gold coating according to the state of the art |
| 2 S 2 G and 3 S 2 G | two- and three-pane insulating glass with double gold coating |
| 2 S E and 3 S E | two- and three-pane insulating glass with coating according to the invention. |

For the first time, glass panes with a high transmission and a low K-value have been realized according to the invention.

FIG. 2 shows the different spectral curves of a solar-absorbing layer of the state of the art and of the solar-transmissive layer according to the invention. The figure shows schematically the respective structure.

While the known solar absorber consists of a transparent dielectric layer in which the metallic pigments are embedded, the structure of the subject of the invention is reversed: Dielectric pigments are embedded in a metallic layer. The invention realizes for the first time high solar transmission with high infrared reflection.

FIG. 3 shows the influence of pigmenting according to the invention on the transmissivity τ and on the reflectivity ρ of a gold layer of 10 nm thickness. Due to the incorporation of $SiO_2$ particles with a 50% volume portion, the solar transmission is increased from 48 to 77%.

The reflection in the far infrared range above 20 μm is hardly impaired, so that the total heat reflectivity $\rho_{IR}$ drops only by 9%. Besides, there is a clear linearization of the spectral structure in the visible range, that is, the typical peak at 500 nm, which is responsible for the coloration of gold, is to a great extent compensated.

The coating according to the invention thus provides glasses of high color neutrality.

The subject matter of the instant invention also differs from objects which are produced by a grid or mesh structure:

The apertures of the grid structure are about 2 μm, that means larger than the light wavelength. The diameters of the transparent particles or pores in the structure according to the invention are 1 to 10 nm.

The increased transmission is achieved in the grid structure by geometric recesses in a layer, but pursuant to the invention by reducing the absorption coefficient, that is, by changing the internal electronic properties of the layer material.

Grid structures are two-dimensional in their effect, whereas structures according to the invention are three-dimensional, even if the film thickness contains only a few layers of dielectric particles.

Effective grid structures can only be realized with a few metals such as Al, for example, Structures according to the invention are preferably composed of metal and dielectric. Both components should meet certain conditions regarding their optical constants, as mentioned above, which permits many real material pairings, however.

Production of the layers according to the invention is not possible with the conventional methods of glass coating by vacuum evaporation or sputtering. Because of the tendency of metallic materials to condense in the form of islets or droplets (H. Mayer: Physik dünner Schichten [Physics of thin layers]; Wissenschaftl. Verlagsgesellschaft, Stuttgart 1955), the contrary structural type (metal pigment in the dielectric matrix) with increased instead of reduced absorption is always obtained in the production of thin composite film. The elimination and reversal of this naturally inherent preferential direction is the subject of the process according to the invention. The concrete realization can be effected according to the following methods:

INTERNAL OXIDATION

A metal alloy or a non-miscible metal-metal system is applied in a thin film on a glass pane. This can be done in known manner by vaporization from one or two sources or by sputtering one or both targets (sequential or simultaneous). The use of two metal components has the effect that one metal is predominantly present as a "pigment", the other as a "carrier". Which component is present in a given system as a pigment can generally not be predicted, but must be determined in each case by tests, where the volume portions and the deposition parameters can be of importance up to a certain degree. After the deposit, the layer is tempered in an oxidizing atmosphere, whereby the pigment component is transformed into a dielectric material (oxide). The pigment component must thus consist primarily of a readily oxidizable metal, such as Al, Mg, Sn, Ce or the like, and the substrate component must consist primarily of a slower oxidizing metal or a noble metal, such as Ni, Cr, Au, Ag or Pt. Under certain circumstances, tempering as a separate step is not necessary, namely when the pigment already oxidizes under normal environmental conditions, as it can be observed in many metals in finely divided form. In this case the insulating glass unit becomes fully effective after a few hours or days solely by storage.

PLASMA CONVERSION

A variation of the method of internal oxidation consists in the use of alternate gas atmospheres with which the selected pigment metal reacts to non-oxide, stable, transparent dielectrics, such as fluorides, nitrides or borides. In connection with the sputtering technique, this can be done in a very elegant manner if a stable, inert, non-toxic compound of the respective partner element is used as a reaction gas, for instance freon for fluorides, nitrogen for nitrides, boric acid esters for borides. These compounds are split in the plasma, so that the corresponding reactive elements are formed directly next to the layer surface and react with the pigment metal.

INTERNAL REDUCTION

A fine-grained layer is produced in which two different dielectric compounds are present side by side. If the particle sizes of the two substances differ greatly from each other, the particles of the larger component will touch each other in the statistical mean, while the smaller particles accumulate preferably in the interstices, and these groups are rather separated from each other. Here too, volume portions, type of material and particle shape play a role, but the difference in the particle size can be considered as an important regulator of the method. How the particle size can be influenced in the specific case by the deposition parameters must again be determined experimentally by optimizing the substrate temperature, growth rate, residual gas pressure, residual gas atmosphere, etc.

After the deposit, the layer is subjected to a temperature treatment, whereby the matrix component is transformed to the metal, and a sintering process starts at the same time which compresses the layer and establishes a good electrical connection between the metal particles.

In this method, the pigment component must thus consist of a transparent, thermally stable compound, such as $Al_2O_3$ or $MgF_2$, and the matrix component must consist of a thermally unstable or easily reducible compound such as NiO, CuO or any other oxide of the transition elements, or a compound of the noble metals. In most cases the use of a reducing hydrogen-containing atmosphere during tempering is necessary or of advantage.

DISPROPORTIONING

A composite layer of a metal and a dielectric (Cermet) is produced in known manner, where the metal particles are embedded, as described above, in the insulating substrate without mutual contact. A chemical reaction is started by a thermal after-treatment, which produces a metallic conductive connection between the metal pigments. This can be achieved by a disproportioning reaction according to the formula

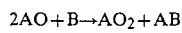

$$2AO + B \rightarrow AO_2 + AB$$

where A and B are two different metals, AO and $AO_2$ are two oxides of A, and AB is an intermetallic compound.

The formation of the new compound results in a recrystallization in the layer, which establishes, with suitable process control and material pairing, a conductive connection between the still unreacted metal pigments B, thus producing a conductive layer with insulating pigments.

An example for the substance AO is SiO, which is disproportioned in oxygen-poor atmosphere to $SiO_2$, and the liberated silicon forms corresponding silicides with the simultaneously present metals such as Cu, Cr, Ni or Pd. Other examples for A are bismuth, tin and indium, which have corresponding suboxides and stable, transparent oxides, and form intermetallic compounds. The last two examples, $SnO_2$ and $In_2O_3$, are in addition IR-transparent and thus bring about additional selectivity, as mentioned above.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

I claim:

1. An insulating glass pane consisting essentially of a glass substrate and a selective coating with high color neutrality, high solar transmissivity, low K-value and high stability on an outer surface of said substrate, said coating comprising a pigment component and a carrier component and consisting of an electrically conductive layer having very small, transparent, non-conductive discrete dielectric zones embedded therein.

2. An insulating glass pane of claim 1, where the absorption coefficient of the carrier component is equal to the refractive index of the pigment component over a broad wavelength range of the solar spectrum including 0.5 µm.

3. An insulating glass pane of claim 1, where the diameters of the dielectric zones embedded in the conductive layer are smaller than the electrically conductive layer thickness and smaller than the shortest light wavelength.

4. An insulating glass pane of claim 1, where the volume fraction of the dielectric zones is at least 50% of the coating volume.

5. An insulating glass pane of claim 1, where the dielectric zones are spherical.

6. An insulating glass pane of claim 1, where the dielectric zones are needle-shaped and their longitudinal axes are perpendicular to the surface of the electrically conductive layer.

7. An insulating glass pane of claim 1, where the carrier component has an absorption coefficient between 1 and 2.5 in the solar system at substantially $\lambda = 0.5$ µm, and the refractive index of the carrier component is not greater than 1.

8. An insulating glass pane of claim 1, where the pigment component is also transmissive in the infrared range at about $\lambda = 10$ µm; $K_p = 0$.

9. An insulating glass pane of claim 1, where the refractive index of the coating is between 1 and 1.5.

10. An insulating glass pane of claim 1, where a metal with a relatively small refractive index in the solar range selected from the group consisting of gold, silver, copper, aluminum, magnesium, yttrium and zirconium, is used as the carrier component.

11. An insulating glass pane of claim 1, where an intermetallic compound of the alkali or alkaline earth metals is used as the carrier component.

12. An insulating glass pane of claim 1, where the pigment component is a semiconductor which is transparent in the visible and in the infrared range selected from the group consisting of $SnO_2$ and $In_2O_3$.

13. An insulating glass pane of claim 1, where the pigment component is selected from the group consisting of air, plastic, alkali metal halides and alkaline earth metal halides which are transparent in the visible and in the infrared range.

14. A process for the production of an insulating glass pane of claim 1, which comprises coating a surface of a glass substrate with a thin layer of a mixture of two metals, and selectively oxidizing one metal component.

15. A process of claim 14, where said metal component is oxidized by exposure to the air.

16. A process of claim 14, where said metal component is oxidized by a heat treatment.

17. A process of claim 14, where said mixture of metals is a metal alloy and said one metal component is oxidized by exposure to the air.

18. A process of claim 17, where said one metal component is oxidized by a heat treatment.

19. A process of claim 14, where said glass substrate is coated by cathode sputtering, and said coating is subjected to a selective reaction of one metal component by plasma conversion in a gaseous compound selected from the group consisting of fluorine, nitrogen and boron compounds, whereby discrete transparent dielectric zones are formed.

20. A process of claim 14, which comprises coating a glass substrate with a thin layer of a mixture of two metal compounds of different thermal stability and different particle size, and subsequently selectively reducing one mixture component to the free metal by a reducing heat treatment.

21. A process of claim 14, which comprises coating a glass substrate with a thin layer of a mixture of discrete particles of a first metal and a suboxide of a second metal and subjecting said coating to partial disproportioning of its components by a subsequent heat treatment, whereby said suboxide is converted into a stable, high-valenced, non-conductive and transparent oxide, and at the same time a conductive compound of said first metal with said second metal is formed which joins the previously separate metal particles conductively with each other.

* * * * *

UNITED STATES PATENT AND TRADEMARK OFFICE
CERTIFICATE OF CORRECTION

PATENT NO. : 4,579,638

DATED : Apr. 1, 1986

INVENTOR(S) : WERNER SCHERBER

It is certified that error appears in the above-identified patent and that said Letters Patent is hereby corrected as shown below:

Column 5, line 31: "$\lambda_{sol}/\rho_{IR}$" should read -- $\tau_{sol}/\rho_{IR}$ --.

Signed and Sealed this

Fifth Day of August 1986

[SEAL]

Attest:

DONALD J. QUIGG

Attesting Officer

Commissioner of Patents and Trademarks